United States Patent

Suzuki et al.

[11] 3,975,330
[45] Aug. 17, 1976

[54] IMIDE-MODIFIED POLYESTER RESIN AND WIRE ENAMEL CONTAINING THE IMIDE-MODIFIED POLYESTER RESIN

[75] Inventors: Yasuhiro Suzuki; Katsuhiko Yamaguchi, both of Ibaraki, Japan

[73] Assignee: Nitto Electric Industrial Co., Ltd., Ibaraki, Japan

[22] Filed: Apr. 18, 1975

[21] Appl. No.: 569,436

[30] Foreign Application Priority Data
May 1, 1974 Japan............................ 49-48278

[52] U.S. Cl.................... 260/75 N; 260/32.6 N; 260/33.4 R; 260/326.26; 260/830 R; 260/838; 260/857 E; 260/858
[51] Int. Cl.²........................................ C08G 73/16
[58] Field of Search......... 260/75 N, 326.26, 830 R, 260/838, 857 E, 858, 33.4 R, 32.6 N

[56] References Cited
FOREIGN PATENTS OR APPLICATIONS

| | | |
|---|---|---|
| 1,450,704 | 7/1966 | France.............................. 260/75 N |
| 1,445,263 | 7/1971 | Germany.......................... 260/75 N |
| 1,203,599 | 8/1970 | United Kingdom............... 260/75 N |

*Primary Examiner*—Eugene C. Rzucidlo
*Attorney, Agent, or Firm*—Sughrue, Rothwell, Mion, Zinn & Macpeak

[57] ABSTRACT

An imide-ring containing polyester comprising the reaction product of (A) (1) a dicarboxylic acid of the formula

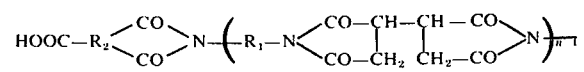

(I)

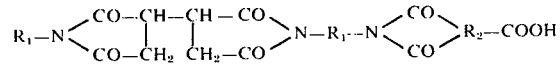

wherein $R_1$ represents a divalent organic group, $R_2$ represents a trivalent organic group, and $n \geq 1$, the dicarboxylic acid of the formula (I) comprising the reaction product of 1 mole of an imide compound having terminal amino groups of the formula (II)

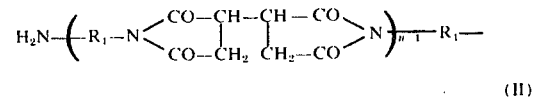

(II)

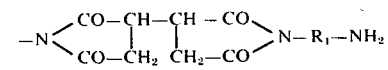

wherein $R_1$ has the same meaning as above, or of an imide precursor thereof, with 2 moles of a tricarboxylic acid anhydride of the formula (III)

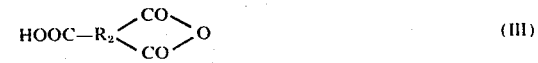

(III)

wherein $R_2$ has the same meaning as above, the imide compound of the formula (II) being prepared by reacting $n$ moles of 1,2,3,4-butanetetracarboxylic acid (hereinafter referred to as BTC) with (n+1) moles of a diamine of the formula (IV)

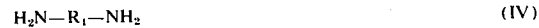

(IV)

wherein $R_1$ has the same meaning as above; or (A) (2) a mixture of the dicarboxylic acid of the formula (I) with at least one other polycarboxylic acid (including the lower alkyl ester thereof) with (B) at least one polyhydric alcohol; and a wire enamel containing the imide ring containing polyester described above.

37 Claims, No Drawings

IMIDE-MODIFIED POLYESTER RESIN AND WIRE ENAMEL CONTAINING THE IMIDE-MODIFIED POLYESTER RESIN

BACKGROUND OF THE INVENTION

1. Field of the Invention

This invention relates to wire enamels, and more particularly, to imide-modified polyester containing wire enamels, the imide-modified polyester containing both cycloaliphatic and aromatic imide-rings in the molecule, and materials used in preparing the imide-modified polyesters.

2. Description of the Prior Art

Wire enamels have been supplied heretofore in the form of a solution of a resin for the enamel dissolved in an appropriate solvent, with the solution having an appropriate viscosity suitable for wire forming operations. When wire enamels are diluted to a specific concentration, those wire enamels having better heat resistance generally have higher viscosity. Accordingly, when enamels are used in actual wire forming operations, they tend to be used in a lower concentration to achieve an optimum viscosity. On the other hand, the active ingredient in wire enamels is the resin material dissolved in the solution, and the solvent is used merely for dissolving the resin therein. The solvent is not directly effective at all for the final purpose of electrical insulation. In addition, wire enamels of lower concentration require a larger amount of energy for evaporation of the solvent in the baking thereof, and therefore, wire enamels of lower concentrations are not economically advantageous.

Presently, conservation of resources and energy is strongly desired, and effective utilization of natural resources and materials is an important concern. It is also important to prevent environmental pollution. As a result it is clear that a decrease in the amount of solvent used in wire enamels is extremely significant.

In general, various methods for reducing the viscosity of wire enamels are known, and some of the methods are as follows: (1) The concentration of the enamel resin can be reduced to reduce the viscosity of the enamel. (2) The enamel resin can be heated to reduce the viscosity of the enamel. (3) The molecular structure of the enamel resin can appropriately modified to reduce the viscosity of the enamel, for example, the polymerization degree of the resin can be reduced. Method (1) is a common method which has now been broadly adopted in this field, but this method is not desirable from the standpoint of economization of natural resources. Therefore, Method (1) is not related to this invention. Method (2) has also already been adopted in this field by heating the wire enamel to a certain temperature range. For example, it is well knwon to heat a wire enamel to 40° to 60°C for use in wire forming operations. However, a temperature of 40° to 60°C is not suitable for satisfactorily increasing the concentration of conventional wire enamels and yet achieving an appropriate viscosity range for wire forming operations. Thus, a further increase in the temperature in operation is inevitable. However, at these further elevated temperatures a hardener component in the enamel sometimes reacts due to the higher temperature or the solvent often evaporates due to the higher temperature, consequently resulting in an increase in the viscosity of the enamel after use for a long period of time. Some problems also exist in Method (3) where the degree of polymerization is reduced, or the molecular structure of the resin is modified to lower the melting point of the resin or to reduce the viscosity of a solution of the resin. In particular, special attention must be paid to changes so that the wire production operations, the appearance of the enamel wire and the heat resistance and mechanical properties of enamel wire are not degraded.

SUMMARY OF THE INVENTION

An object of this invention is to provide an imide-modified polyester and wire enamels containing an imide-modified polyester, these polyesters being polyesters which have been modified so that the solubility of the resin itself is further increased or the melting point of the resin is effectively lowered, so that sufficient heat resistance and mechanical properties are imparted to the resin and so that the increase in viscosity of the resin is less even when the resin is used in actual wire forming operations under heating at a relatively high temperature.

Therefore, one aspect of this invention provides an imide-ring containing polyester comprising the reaction product of (A)(1) a dicarboxylic acid of the formula (I)

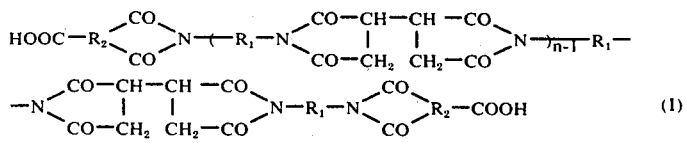

wherein $R_1$ represents a divalent organic group, $R_2$ represents a trivalent organic group, and $n \geq 1$, the dicarboxylic acid of the formula (I) comprising the reaction product of 1 mole of an imide compound having terminal amino groups of the formula (II)

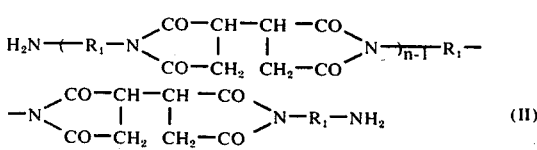

wherein $R_1$ has the same meaning as above, or of an imide precursor thereof, with 2 moles of tricarboxylic acid anhydride of the formula (III)

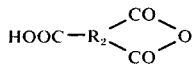

(III)

wherein $R_2$ has the same meaning as above, the imide compound of the formula (II) being prepared by reacting $n$ moles of 1,2,3,4-butanetetracarboxylic acid (hereinafter referred to as BTC) with $(n+1)$ moles of a diamine of the formula (IV)

(IV)

wherein $R_1$ has the same meaning as above; or (A)(2) a mixture of the dicarboxylic acid of the formula (I) with at least one other polycarboxylic acid (including the lower alkyl ester thereof) with (B) at least one polyhydric alcohol.

A further aspect of the invention provides a wire enamel containing the imide ring containing polyester described above.

DETAILED DESCRIPTION OF THE INVENTION

In preparation of general imide-modified polyester wire enamels, it is common to use an aromatic imide compound obtained by reaction of an aromatic acid anhydride such as trimellitic anhydride and an amine, as a component for imide-modification. In this case, however, in general, the melting point of the modified resin is consequently higher than that of the corresponding non-modified resin.

BTC which is aliphatic is used in the present invention in place of the aromatic acid anhydride and the present invention has been achieved. That is, it has been found that according to the present invention where BTC is specifically used, it is possible to prepare imide-modified resins of lower melting point in spite of the high heat resistance of the resins and that it also is possible to prepare a wire enamel of higher concentration on dissolving the resin in an organic solvent and yet not increase the viscosity above a specific level.

In the present invention, the introduction of imide bonds into polyester resins to prepare imide-modified polyester resins is preferably carried out through the following reaction steps: As described above, BTC and an excess molar amount of diamine are first reacted to prepare a compound of the above-described formula (II), the terminal amino groups of the resulting compound are reacted with a tricarboxylic acid anhydride to form a dicarboxylic acid of the formula (I) which contains imide rings (or the corresponding amide acid groups before formation of the imide rings), and the resulting dicarboxylic acid, optionally together with other polycarboxylic acids (including the lower alkyl esters thereof), is reacted with a polyhydric alcohol.

Various aspects of the reaction step for preparing the imide ring containing dicarboxylic acid of the formula (I) have been investigated and it has been found that the dicarboxylic acid of the formula (I) in which both terminal groups are monocarboxylic acid groups is more effective than any other compounds, in which at least one terminal group possibly consists of two carboxyl groups, these latter compounds being prepared, for example, by reaction of a diamine with an equivalent molar amount or an excess molar amount of BTC. In the latter case, that is, in the case of imide ring containing carboxylic acids in which the terminal groups possibly consist of two carboxyl groups, these carboxylic acids tend to easily gel in the subsequent esterification reaction in which they are used, and further, when the resulting resins obtained from these carboxylic acids are used as hot-melting type enamels of high concentration or free of solvent, the viscosity of the resin tends to readily increase on heating. While not desiring to be bound, it is believed that these disadvantageous phenomena result from the fact that the carboxyl groups in BTC react relatively easily with the hydroxyl group which is also present. On the other hand, when the dicarboxylic acid of the formula (I) of this invention is used, rapid gelation does not occur in the subsequent esterification reaction in which it is used and when the resulting resin is to be used as a wire enamel under heating at about 40° to 100°C or so, no noticeable increase in the viscosity of the wire enamel is observed.

Aromatic tricarboxylic acid anhydrides to be reacted with the amino groups of the imide compound of the formula (II) in the subsequent esterification reaction are especially preferable.

As explained above, the following three points are indispensable elements in the preparation of imide ring containing dicarboxylic acids in the present invention: (1) BTC is used as a polycarboxylic acid to be reacted with the diamine (IV). (2) An excess molar amount of the diamine (IV) is reacted with BTC. (3) The terminal amino groups in the resulting imide compound or amide acid compound of the formula (II) are reacted with an equivalent amount of a tricarboxylic acid anhydride of the formula (III).

The preparation of imide ring containing dicarboxylic acids of the formula (I) is preferably carried out in an aromatic solvent such as cresol, xylenol or phenol or in a nitrogen-containing solvent such as dimethylformamide, dimethylacetamide or N-methyl-2-pyrrolidone, by reaction of BTC with the diamine (IV) to prepare a compound of the formula (II), followed by the subsequent reaction of the resulting compound (II) with a tricarboxylic acid anhydride (III). The reaction temperature in the preparation of compounds of the above-described formulae (I) and (II) generally ranges from about 60° to 230°C, more preferably 120° to 200°C. The concentration of the reaction solution is preferably about 30 to 80% by weight, more preferably 50 to 60% by weight. In the above formulae (I) and (II), $n$ is a number of 1 or more, i.e., up to about 8, preferably in the range of $1 \leq n \leq 5$, although $n$ is not specifically limited to this range and can vary.

When a nitrogen-containing solvent such as N-methyl-2-pyrrolidone is used as a solvent, the reaction system for producing the compound of the formula (I) is a solution which is transparent even at room temperature (about 20° ~ 30°C). On the other hand, when a phenol type solvent such as cresol is used, the reaction system condition varies depending upon the value of $n$. More particularly, where $n$ is 1 to 3, the reaction system is a suspension, while where $n \geq 4$, the reaction system is a transparent solution. For comparison, when ditrimellitic-imide acid is prepared as an aromatic imide compound, for example, in a phenol type solvent such as cresol from 1 mole of a diamine and two moles of trimellitic acid anhydride, the concentration thereof is at most 30% by weight, and the reaction system solidifies at a higher concentration, causing difficulty in the reaction proceeding smoothly. On the contrary, in the case of the imide ring containing dicarboxylic acids of the formula (I), reaction in a higher concentration of about 30 to 80% by weight, preferably 50 to 60% by weight as described above is possible, which is clearly one feature of this invention.

The completion of the reaction is the preparation of the imide ring containing dicarboxylic acids (I) is determined by measuring the amount of water produced as a by-product, or preferably by determination of the acid value.

A solution or suspension of the thus prepared imide ring containing dicarboxylic acid (I) is added to a poor solvent for the acid such as methanol or petroleum ether, and the imide ring containing dicarboxylic acid (I) is re-precipitated, washed and dried using conventional techniques to obtain fine powders, which are pale yellow-brown and are not melted upon heating up to 250°C.

As an organic diamine which can be used in this invention, a diamine compound having the general formula $$H_2N - R_1 - NH_2 \qquad (IV)$$

wherein $R_1$ represents a divalent aliphatic, alicyclic or aromatic group, is suitable. More specifically, in the general formula (IV), $R_1$ can be selected from the group consisting of $-(CH_2)_{n_1}-$
wherein $n_1$ is an integer of from 1 to 11,

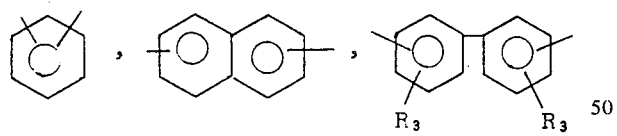

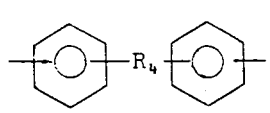

wherein $R_4$ is selected from the group consisting of $-CH_2-$, $-O-$, $-S-$, $-SO_2-$, $-CO-$,

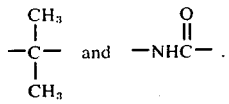

Of these compounds of the formula (IV), aromatic diamines are especially preferred. Representative examples of these diamines are ethylenediamine, m-phenylenediamine, p-phenylenediamine, 4,4'-diaminodiphenylmethane, 4,4'-diaminodiphenylethane, 4,4'-diaminodiphenylpropane, 4,4'-diaminodiphenylether, 4,4'-diaminodiphenylsulfone, 3,3'-diaminodiphenylsulfone, 4,4'-diaminodiphenylsulfide, benzidine, 3,3'-dichlorobenzidine, 3,3'-dimethylbenzidine, p-bis(4-aminophenoxy)benzene, 1,5-diaminonaphthalene, 2,6-diaminonaphthalene, 3,3'-dimethyl-4,4'-diaminobiphenyl, 3,4'-diaminobenzanilide, 3,3'-dimethoxybenzidine, 3,4'-diaminodiphenylether, m-xylylenediamine, p-xylylenediamine, di(p-aminocyclohexyl)methane, 4,4'-diaminophenylketone, hexamethylenediamine, heptamethylenediamine, octamethylenediamine, nonamethylenediamine, 4,4'-dimethylheptamethylenediamine, 3-methoxy-heptamethylenediamine, 2,11-diaminododecane, 1,4-diaminocyclohexane, 2,6-diaminopyridine, etc. These diamines can be used singly or in the form of a mixture thereof.

Aromatic tricarboxylic acid anhydrides are represented by the following general formula (III)

wherein $R_2$ represents a trivalent aromatic group having 6 or more carbon atoms, with two bonds of the three bonds of $R_2$ being positioned adjacent each other. More specifically, $R_2$ can be selected from the group consisting of

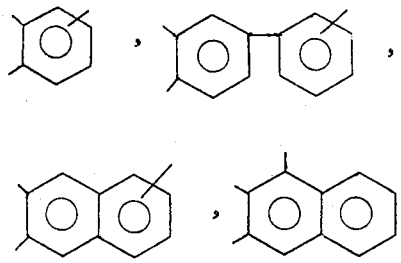

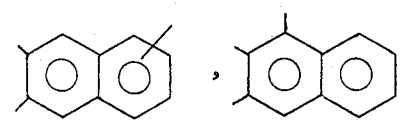

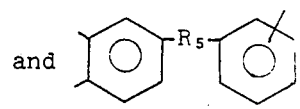

wherein $R_5$ represents $-CH_2-$, $-O-$, $-S-$, $-SO_2-$, $-CO-$ or

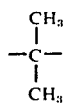

Typical examples of these acid anhydrides are trimellitic anhydride, hemimellitic anhydride, 3,4,3' (or 3,4,4')-biphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, 2,3,6 (or 2,3,5 or 1,2,4)-naphthalenetricarboxylic anhydride, etc. These acid anhydrides can be used singly or in the form of a mixture thereof.

Examples of the preparation of imide ring containing dicarboxylic acids (I) of the present invention are given below where 4,4'-diaminodiphenylmethane (hereinafter referred to as DAM) is used as the diamine (IV), trimellitic anhydride (hereinafter referred to as TMA) is used as the tricarboxylic acid anhydride (III), and cresol is used as a solvent.

PREPARATION EXAMPLE A

Where $n = 1$ in the formula (I):

139 g (0.7 mole) of DAM and 355 g of cresol were placed in a four neck flask (capacity: 1000 ml) provided with a thermometer, a condenser with a trap and a stirrer, and were heated at 80°C while stirring. Next, 82 g (0.35 mole) of BTC was added thereto, and after the reaction system was stirred for 30 minutes at 80° ~ 100°C, 134 g (0.7 mole) of TMA was added thereto at 80°C. After heating at 110°~ 120°C, water as a by-product began to distil out, and at the same time, the system which was transparent until then became opaque. After being further heated and continuously reacted for 3 hours at 180°~200°C, the system became transparent, and the total amount of water distilled out therefrom was 37 g. The system was poured in 2000 ml of methanol, and re-precipitated, washed and dried using conventional means, whereby 280 g of a pale brown powder was obtained. The acid value of the resulting powder was 120 (theoretical value: 124) and the melting point thereof was 250°C or above.

PREPARATION EXAMPLE B

Where $n = 2$ in the formula (I):

In a four neck flask (capacity: 1000 ml) provided with a thermometer, a condenser with a trap and a stirrer were placed 149 g (0.75 mole) of DAM and 362 g of cresol, and the mixture was heated at 80°C while stirring. Next, 117 g (0.5 mole) of BTC was added thereto, and after the reaction system was stirred for 30 minutes at 80° ~ 100°C, 96 g (0.5 mole) of TMA are added thereto at 90°C. After heating at 110° ~ 120°C, water as a by-product began to distil out, and at the same time, the system which was transparent until then became opaque. After being further heated and continuously reacted for 2 hours at 180°~ 200°C, the system became transparent, and the total amount of water by-product was 44.5 g. The system was placed in 2000 ml of methanol, and re-precipitated, washed and dried using conventinal means, whereby 242 g of a pale brown powder was obtained. The acid value of the resulting powder was 87 (theoretical value: 89) and the melting point thereof was 250°C or above.

PREPARATION EXAMPLE C

Where $n = 3$ in the formula (I):

In a four neck flask (capacity: 1000 ml) provided with a thermometer, a condenser with a trap and a stirrer were placed 158 g (0.8 mole) of DAM and 207 g of cresol, and the mixture was heated at 80°C while stirring. Next, 140 g (0.6 mole) of BTC was added thereto, and the contents were gradually heated and reacted for 4 hours at 170° ~ 180°C. The total amount of water by-product distilled out therefrom was 40 g. Next, the reaction system was cooled to 100°C, 77 g (0.4 mole) of TMA was added thereto, then the temperature of the system was gradually increased and the mixture was reacted for 2 hours at 180° ~ 200°C. The amount of water distilled out from the reaction was 8.5 g. The resulting system was placed in 2000 ml of methanol, and then re-precipitated, washed and dried using conventional means, whereby 281 g of a pale brown powder was obtained. The acid value of the resulting powder was 64.5 (theoretical value: 69) and the melting point thereof was 250°C or above.

PREPARATION EXAMPLE D

Where $n = 4$ in the formula (I):

In a four neck flask (capacity: 1000 ml) provided with a thermometer, a condenser with a trap and a stirrer were placed 158 g (0.8 mole) of DAM and 294 g of cresol, and the contents were heated at 85°C while stirring. Next, 150 g (0.64 mole) of BTC was added thereto, and the reaction system was gradually heated and reacted for 2 hours at 160° ~ 180°C. The total amount of water by-product distilled out therefrom was 37 g. Next, the reaction system was cooled to 100°C, 51 g (0.32 mole) of TMA was added thereto, and the reaction system was again gradually heated and reacted for 2 hours at 180° ~ 200°C. The total amount of water distilled out from the reaction system was 48 g. The system was placed in 2000 ml of methanol, and re-precipitated, washed and dried using conventional means, whereby 277 g of a pale brown powder was obtained. The acid value of the powder was 58 (theoretical value: 56) and the melting point thereof was 250°C or above.

In the above Examples, the preparation of dicarboxylic acids of the formula (I) where $n$ is an integer of about 1 to 4, is exemplified, but the present invention is not to be construed as being limited to only these cases.

The thus prepared imide ring containing dicarboxylic acids (I) are used as polycarboxylic acid component in the subsequent synthesis of imide-modified polyester resins. The dicarboxylic acid of the formula (I) can be used in a proportion of at least about 5% by weight, preferably 30% by weight or more, and up to 100% by weight of the acid component. The imide ring containing dicarboxylic acid can be reacted singly with a polyhydric alcohol to prepare a resin, or otherwise the acid can be subjected to the esterification reaction together with other polycarboxylic acids or derivatives thereof such as terephthalic acid, dimethyl terephthalate, diethyl terephthalate, isophthalic acid, dimethyl isophthalate, diethyl isophthalate, 1,4 (or 1,5 or 2,6)-naphthalene dicarboxylic acid or adipic acid. In general, the combined use with these polycarboxylic acids is preferred for obtaining especially preferred wire enamels. A suitable proportion of the dicarboxylic acid component and of the alcohol component in the imide-modified polyester resin can be represented by the following relationship:

—OH/—COOH molar ratio = about 1.2 to 1.6

The esterification reaction can be carried out using conventional techniques in which the reaction temperature is about 100° to 270°C and water or a lower alcohol as a by-product is removed from the system as required as the reaction proceeds. The reaction can be carried out in the absence of a solvent, and, as the case may be, the reaction can also be carried out in the presence of a solvent such as phenol, cresol, xylenol, N-methyl-2-pyrrolidone, or dimethylacetamide. In addition, the reaction can also be effectively conducted under reduced pressure without a solvent.

When a di-lower alkyl ester of a polycarboxylic acid such as dimethyl terephthalate or dimethyl isophthalate is used in combination as an additional polycarboxylic acid component, it is advantageous to use a catalyst such as antimony trioxide, zinc acetate, lead acetate, cadmium acetate or manganese acetate. The catalyst generally is used in a proportion to about 0.05 to 0.2% by weight to the dialkyl ester used.

The completion of the reaction is preferably determined by measuring the softening point of the resin obtained (JIS K-2531) in the case of the reaction in the absence of a solvent or by a measurement of the viscosity of the reaction system where the reaction is conducted in solution. The softening point of imide-modified polyester resins varies, depending upon the proportion of the raw materials used, and is, in general, in the range of about 50° to 200°C, preferably 60° to 150°C. The viscosity of the reaction system also varies mainly depending upon the reaction temperature and the concentration of the reaction system during the reaction, and is, for example, about 0.5 to 5 poise, preferably 1 to 4 poise, when the reaction is carried out at a temperature of 230° ± 2°C and in a concentration of 80% by weight.

The thus obtained imide-modified polyester resins and a solution thereof are soluble in phenol, cresol or xylenol or a mixture thereof with naphtha.

The properties of wire enamel resins can be further improved by adding to the resin solution an organo-metal compound as a hardener, such as tetrapropyl titanate, tetrabutyl titanate or titanium methyl acetoacetate phenolate, in an amount of about 0.5 to 5% by weight on the basis of the resin content. In addition, the coating ability of the wire enamel resins can also be improved by adding to the resin solution one or more metal (e.g., Mn, Co, Zn, Cd, Fe, Pb) octenoates or naphthenates as a hardening accelerator, in an amount of about 0.06 to 0.2% by weight (calculated in terms of the metal content) on the basis of the resin content. In particular, when a organo-metal chelate compound such as titanium methyl acetoacetate phenolate is used as the hardener, the heat stability of the wire enamel is especially improved, which is particularly effective when the imide-modified polyester resins of the present invention are used as hot-melting type wire enamels.

If desired, other resins such as phenol resins, melamine resins, epoxy resins and blocked polyisocyanates can optionally be added to the resins of the present invention. If employed, these additional resins can be added in a proportion of about 0.5 to 10% by weight to the resins of this invention.

Polyhydric alcohols which can be used in the present invention are di-, tri- and tetra-hydric alcohols, and representative examples thereof are ethylene glycol, diethylene glycol, triethylene glycol, propylene glycol, dipropylene glycol, 1-methylpropylene glycol, neopentyl glycol, 1,4-butanediol, 1,5-butanediol, 1,6-hexanediol, glycerin, trimethylol propane, tris(2-hydroxyethyl)isocyanurate and pentaerythritol.

In the above description, one embodiment for imide-modification is explained where an imide ring containing dicarboxylic acid which is to be converted to an imide-modified polyester resin is previously synthesized and separated by re-precipitation, and then the dicarboxylic acid obtained is subjected to the subsequent esterification reaction. In addition to this embodiment, a polyhydric alcohol optionally together with other polycarboxylic acids can be added to the reaction system without re-precipitation, of the formed imide ring containing dicarboxylic acid, whereby the final resin can be obtained in one-step. In addition, still other methods can be employed in the present invention where the imide ring containing dicarboxylic acid is synthesized in the presence of a polyhydric alcohol and optionally other polycarboxylic acids and is successively subjected to the following esterification in the same reaction system to prepare the final resin, or a polyester resin can be previously synthesized from another polycarboxylic acid and polyhydric alcohol and then the raw materials for formation of the imide ring containing dicarboxylic acid are added thereto and reacted to prepare the final resin.

The present invention is explained in greater detail by reference to the following Examples. Unless otherwise indicated, all parts, percents, ratios and the like are by weight. For simplicity the raw materials used are abbreviated as follows:

Dimethyl terephthalate: DMT
Isophthalic acid: IPA
Ethylene glycol: EG
Glycerin: G
Diethylene glycol: DEG
Triethylene glycol: TEG
tris(2-Hydroxyethyl)isocyanurate: THEIC
1,2,3,4-Butanetetracarboxylic acid: BTC
Trimellitic anhydride: TMA
Diaminodiphenylmethane: DAM
Diaminodiphenylether: DDE

EXAMPLE 1

95 g of the imide ring containing dicarboxylic acid prepared in Preparation Example A, 251 g of DMT, 85 g of EG and 45 g of G were placed in a four neck flask (capacity: 1000 ml) provided with a thermometer, a condenser with a trap and a stirrer, and heated at 140°C. The system was brown and opaque. 0.5 g of manganese acetate was added thereto while stirring. The reaction was carried out at 180°C for 3 hours and then at 200°C for 3 hours, and the system became transparent with the distillation of water and methanol from the reaction. Afterwards, the system was reacted further at 230°C for 3 hours and then was subjected to reaction under reduced pressure for 30 minutes at the same temperature. The resin obtained had a softening point of 112°C and an acid value of 1 or less.

Next, 300 g of a mixed solvent of cresol/naphtha (6/4 by volume) was added and the reaction system dissolved. 4 g of zinc octenoate (metal content: 10% by weight) was added, and then a solution of 12 g of tetrabutyl titanate diluted to a volume which was three times the original volume with a mixed solvent of cresol/naphtha (6/4 by volume) was added at 120°C and stirred for 2 hours. Afterwards, 65 g of a mixed solution of cresol/naphtha (6/4 by volume) was added to adjust the viscosity, followed by stirring for 1 hour. The thus prepared wire enamel had a viscosity of 52 poise (at 30°C), and the nonvolatile content thereof was 52.4%. The wire enamel was baked on a circular copper wire (diameter: 1 mm) in a baking furnace having an effective furnace length of 3 m where the baking condition was as follows: temperature: 4502 C; baking times: 6 times; rate: 6.0 m/min. Thus, an enamel wire was obtained, and the properties thereof are shown in Table 1 below. In particular, the heat resistance of the wire was excellent.

EXAMPLE 2

257 g of DMT, 148 g of DEG and 45 g of G were placed in a four neck flask (capacity: 1000 ml) provided with a thermometer, a condenser with a trap and a stirrer, and heated at 140°C. 0.5 g of manganese acetate was added thereto while heating. The reaction was carried out at 180°C for 3 hours, at 200°C for 3 hours and at 230°C for 3 hours, and ultimately the amount of methanol distilled from the reaction was 78 g. Next, the temperature of the reaction system was reduced to 200°C, and 97 g of the imide ring containing dicarboxylic acid obtained in Preparation Example B was added thereto. After reaction for about 1 hour at 200° ~ 210°C, the system became transparent. Afterwards, the system was further reacted for 3 hours at 230°C and then was reacted under reduced pressure for 30 minutes at the same temperature. The resin obtained had a softening point of 90°C and an acid value of 1 or less. Similar to Example 1, the resin was dissolved in a mixed solvent of cresol/naphtha (6/4 by volume) and 4.5 g of zinc octenoate and 13.5 g of tetrabutyl titanate were added thereto, whereby a wire enamel was finally obtained having a viscosity of 37 poise (at 30°C) and containing a non-volatile content of 50.7%. The enamel was baked on a copper wire similar to Example 1 to produce an enamel wire, the properties of which are given in Table 1 below.

EXAMPLE 3

130 g of DMT, 111 g of IPA, 85 g of EG and 45 g of G were placed in a four neck flask (capacity: 1000 ml) provided with a thermometer, a condenser with a trap and a stirrer, 0.5 g of zinc acetate was added thereto at 140°C, and the entire contents were reacted at 180°C for 3 hours, at 200°C for 3 hours and at 230°C for 4 hours. The reaction system was transparent. Next, the temperature of the system was reduced to 200°C, and 97 g of the imide ring containing dicarboxylic acid obtained in Preparation Example C was added thereto. After reaction for about 1 hour at 210° ~ 220°C, the system became transparent. Afterwards, the system was reacted further for 3 hours at 230°C and then was subjected to reaction under reduced pressure for 20 minutes at the same temperature. The obtained resin had a softening point of 98°C and an acid value of 1 or less. Similar to Example 1, the resin was dissolved in a mixed solvent of cresol/naphtha (6/4 by volume) and 4.5 g of zinc octenoate and 13.5 g of tetrabutyl titanate were added thereto, whereby a wire enamel was finally obtained, having a viscosity of 41 poise (at 30°C) and containing a non-volatile content of 52.1%. The enamel was baked on a copper wire similar to Example 1 to produce an enamel wire, the properties of which are given in Table 1 below.

EXAMPLE 4

299 g of the imide ring containing dicarboxylic acid obtained in Preparation Example D, 26 g of THEIC, 4 g of EG and 83 g of cresol were placed in a four neck flask (capacity: 1000 ml) provided with a thermometer, a condenser with a trap and a stirrer, and reacted at 180°C for 3 hours and then at 200°C for 3 hours. Afterwards, the reaction was continuously carried out further at 230° ~ 235°C until the viscosity of the system at the temperature became 2.5 poise. The viscosity was measured with a B-type Brookfield viscometer in which the rotating head thereof was hung from the neck of the flask. Similar to Example 1, the resin was dissolved in a mixed solvent of cresol/naphtha (6/4 by volume) and 1.5 g of zinc octenoate and 3 g of tetrabutyl titanate were added thereto, whereby a wire enamel was finally obtained, having a viscosity of 62 poise (at 30°C) and containing a non-volatile content of 41.8%. The enamel was baked on a copper wire similar to Example 1 to produce an enamel wire, the properties of which are given in Table 1 below.

EXAMPLE 5

271 g of DMT, 70 g of EG and 65 g of G were placed in a four neck flask (capacity: 1000 ml) provided with a thermometer, a condenser with a trap and a stirrer, and heated at 140°C, and then 0.27 g of zinc acetate was added thereto while stirring. The reaction is carried out at 180°C for 3 hours, at 200°C for 3 hours and at 230°C for 2 hours. The amount of methanol distilled from the reaction was 82 g. Next, the system was cooled to 130°C, and 24 g of DDE and 19 g of BTC were added thereto and reacted for 1 hour at 140° ~ 150°C. Afterwards, the system was again cooled to 120°C, and 15 g of TMA was added thereto. (The respective amount of DDE, BTC and TMA corresponded to $n = 2$ in the formula (II).) After gradually being heated and reacted for 6 hours at 180° ~ 230°C, the system was reacted under reduced pressure for 1 hour at 230°C. The total amount of distillate from the reaction was 121 g. The resin obtained had a softening point of 92°C and an acid value of 1 or less. The thus prepared resin was dissolved in a mixed solvent of cresol/naphtha (6/4 by volume) similar to Example 1, and 3.3 g of zinc octenoate and 12 g of titanium methyl acetoacetate phenolate were added thereto, whereby a wire enamel was finally obtained, having a viscosity of 44 poise (at 30°C) and containing a non-volatile content of 52.3%. The enamel baked on a copper wire similar to Example 1 to produce an enamel wire, the properties of which are given in Table 1 below.

EXAMPLE 6

271 g of DMT, 158 g of TEG and 183 g of THEIC were placed in a four neck flask (capacity: 1000 ml) provided with a thermometer, a condenser with a trap and a stirrer, and heated at 140°C, and then 0.4 g of cadmium acetate was added thereto while stirring. The reaction was carried out at 200°C for 3 hours and then at 230°C for 4 hours. The amount of methanol distilled from the reaction was 86 g. Next, after the system was cooled to 130°C, 48 g of DAM and 38 g of BTC were added to the reaction system and the system was reacted for 2 hours at 140° ~ 145°C. Afterwards, the system was again cooled to 120°C, and 30 g of TMA was added thereto. (The respective amount of DAM, BTC and TMA used corresponded to $n = 2$ in the formula (II).) After gradually being heated and reacted for 6 hours at 180° ~ 230°C, the system was subjected to reaction under reduced pressure for 20 minutes at about 230°C. The total amount of distillate from the reaction was 108 g. The resin obtained had a softening point of 88°C and the acid value thereof was 1 or less. Next, the resin was heated at 150°C and 3 g of zinc octenoate was added thereto while stirring and then the system was further stirred for 30 minutes. Afterwards, 12 g of titanium methyl acetoacetate phenolate was added dropwise to the resin mixture over the course of about 30 minutes at the same temperature. The reaction system was further stirred for 1 hour at the same temperature and then removed from the flask, cooled and pulverized to a powder. The melt viscosity of the thus obtained powder was 25 poise (at 140°C) and the non-volatile content of the powder was 95.6% (weight: 1.5 g, after heating for 2 hours at 200°C). This was used as a hot-melting type wire enamel. The powder was put in a varnish container provided with a heater and heated at 140°C and melted. While the surroundings of the die part were simultaneously heated with an infrared lamp, the enamel was baked twice on a circular copper wire (core diameter: 1 mm) under the following conditions to prepare an enamel wire: (baking condition: effective length of furnace: 3 m; temperature in furnace: 450°C; rate: 5.0 m/min) The properties of the wire enamel obtained are given in Table 1 below. After the wire enamel containing no solvent was stored in a thermostat for 3 days at 140°C, no increase in the viscosity of the wire enamel was observed. For comparison, ditrimelliticimide acid obtained by reaction of 1 mole of DAM and 2 moles of TMA was used as a component for imide-modification, and a polyester imide-modification with this component which was nearly equivalent to that of Example 6 was conducted to prepare a comparative imide-modified resin. However, the softening point of the resulting resin exceeded 150°C despite the omission of the reaciton step under reduced pressure, and thus this resin was unsuitable as a wire enamel as compared with the resin in Example 6. After the comparative resin was diluted with a mixed solvent of cresol/naphtha (6/4 by volume) in an amount of up to 50% by weight, the viscosity thereof at 30°C exceeded 100 poise. The properties of the wire enamel with the DMT-EG-G type, solvent type conventional polyester varnish are given in Table 1 for comparison.

TABLE 1

| | Example No. | | | | | | Comparative Ex. |
|---|---|---|---|---|---|---|---|
| | 1 | 2 | 3 | 4 | 5 | 6 | |
| Core Diameter of Wire (mm) | 0.995 | 0.995 | 0.995 | 0.998 | 0.995 | 0.998 | 0.995 |
| Thickness of Baked Film (mm) | 0.040 | 0.040 | 0.039 | 0.040 | 0.040 | 0.038 | 0.040 |
| Flexibility (wound after 20% elongation) | 1d good | 1d good | 1d good | 1d good | 1d good | 1d good | 1d good |
| Closeness (rapid elongation cutting) | good | good | good | good | good | good | good |
| Abrasion Resistance (load 600 g) | 67 times | 84 times | 82 times | 58 times | 71 times | 52 times | 43 times |
| Heat Shock (200°C × 1 hour) | 1d good | 1d good | 1d good | 1d good | 2d good | 1d good | 5d poor |
| Heat Shock (20% elongation 200°C × 30 minutes) | 2d good | 2d good | 2d good | 1d good | 3d good | 2d good | 7d poor |
| Heat Softening Temperature (load 2.1 kg, 2°C/min) | 389°C | 377°C | 372°C | 421°C | 353°C | 381°C | 315°C |
| Winding Character after Deterioration under Heat (200°C × 24 hours) | 1d good | 1d good | 1d good | 1d good | 1d good | 1d good | 1d good |
| Breakdown Voltage (two wires twisted) | 13.6 kv | 13.3 kv | 12.7 kv | 13.8 kv | 13.7 kv | 10.2 kv | 13.6 kv |
| Breakdown Voltage after Deterioration (two wires twisted, 240°C 168 hours) | 11.4 kv | 12.3 kv | 10.6 kv | 11.7 kv | 9.7 kv | 8.4 kv | 5.2 kv |
| Alkali Resistance (NaOH 3%, 23°C × 24 hours)-pencil hardness | 5H | 5H | 5H | 5H | 4H | 5H | 4H |

As explained above in detail, imide-modified polyester wire enamels obtained according to the present invention are structurally novel due to the cycloaliphatic imide-modification with BTC, which is different from conventional aromatic imide-modified polyester wire enamels. These wire enamels of the invention have the advantages that the heat resistance of the baked enamel film is sufficient, the melting point of the resin is low, the solubility of the resin is improved, and the preparation of a highly concentrated resin solution is possible. Thus, the wire enamel resins of the present invention are extremely industrially valuable.

While the invention has been described in detail and with reference to specific embodiments thereof, it will be apparent to one skilled in the art that various changes and modifications can be made therein without departing from the spirit and scope thereof.

What is claimed is:

1. An imide-modified polyester resin comprising the reaction product of (A) (1) a dicarboxylic acid of the formula (I)

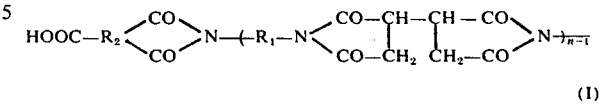
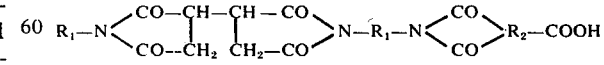

(I)

wherein $R_1$ represents a divalent organic group; $R_2$ represents a trivalent aromatic organic group and $n \geq 1$, or (A) (2) a mixture of at least about 5% by weight of said dicarboxylic acid of the formula (I) with up to about 95% by weight of at least one other polycarboxylic acid or the lower alkyl ester thereof; with (B) a polyhydric alcohol; said dicarboxylic acid of the formula (I) comprising the reaction product of 1 mole of an imide compound having terminal amino groups of the formula (II)

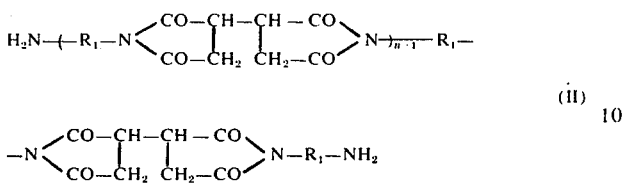

(II)

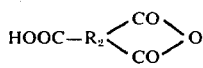

wherein $R_1$ has the same meaning as above, or of an imide precursor thereof, with 2 moles of a tricarboxylic acid anhydride of the formula (III)

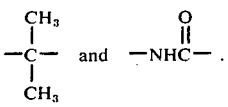

(III)

wherein $R_2$ has the same meaning as above, said imide compopund of the formula (II) comprising the reaction product of $n$ moles of 1,2,3,4-butanetetracarboxylic acid with ($n+1$) moles of a diamine of the formula (IV)

$$H_2N-R_1-NH_2 \quad (IV)$$

wherein $R_1$ has the same meaning as above.

2. The imide-modified polyester resin as claimed in claim 1, wherein said imide compound of the formula (II) comprises the reaction product of said 1,2,3,4-butanetetracarboxylic acid and said diamine in an aromatic solvent or in a nitrogen-containing solvent.

3. The imide-modified polyester resin as claimed in claim 2, wherein said dicarboxylic acid of the formula (I) and said imide compound of the formula (II) both comprise the reaction product obtained at a temperature ranging from about 60° to 230°C.

4. The imide-modified polyester resin as claimed in claim 1, wherein $n$ is 1 to 5.

5. The imide-modified polyester resin as claimed in claim 1, wherein $R_1$ represents a divalent aliphatic group, a divalent alicyclic group or a divalent aromatic group.

6. The imide-modified polyester resin as claimed in claim 5, wherein $R_1$ is selected from the group consisting of

wherein $n_1$ is an integer of from 1 to 11;

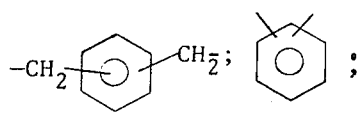

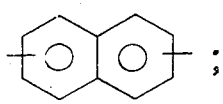

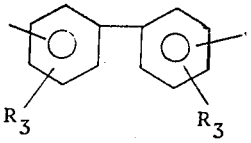

wherein $R_3$ is selected from the group consisting of —H, —Cl, —Br, —OCH$_3$, —CH$_3$ and —C$_2$H$_5$; and

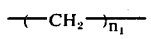

wherein $R_4$ is selected from the group consisting of —CH$_2$—, —O—, —S—, —SO$_2$—, —CO—,

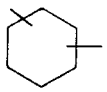

7. The imide-modified polyester resin as claimed in claim 1, wherein said diamine is an aromatic diamine.

8. The imide-modified polyester resin as claimed in claim 1, wherein said diamine is ethylenediamine, m-phenylenediamine, p-phenylenediamine, 4,4'-diaminodiphenylmethane, 4,4'-diaminodiphenylethane, 4,4'-diaminodiphenylpropane, 4,4'-diaminodiphenylether, 4,4'-diaminodiphenylsulfone, 3,3'-diaminodiphenylsulfone, 4,4'-diaminodiphenylsulfide, benzidine, 3,3'-dichloroobenzidine, 3,3'-dimethylbenzidine, p-bis(4-aminophenoxy)-benzene, 1,5-diaminonaphthalene, 2,6-diaminonaphthalene, 3,3'-dimethyl-4,4'-diaminobiphenyl, 3,4'-diaminobenzanilide, 3,3'-dimethoxybenzidine, 3,4'-diaminodiphenylether, m-xylylenediamine, p-xylylenediamine, di(p-aminocyclohexyl)methane, 4,4'-diaminophenylketone, hexamethylenediamine, heptamethylenediamine, octamethylenediamine, nonamethylenediamine, 4,4'-dimethylheptamethylenediamine, 3-methoxyheptamethylenediamine, 2,11-diaminododecane, 1,4-diaminocyclohexane, or 2,6-diaminopyridine.

9. The imide-modified polyester resin as claimed in claim 1, wherein $R_2$ represents a trivalent aromatic group having 6 or more carbon atoms, with two bonds of the three bonds of $R_2$ being positioned adjacent each other.

10. The imide-modified polyester resin as claimed in claim 9, wherein $R_2$ is selected from the group consisting of

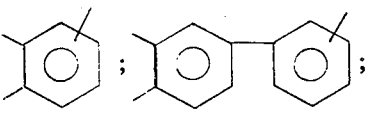

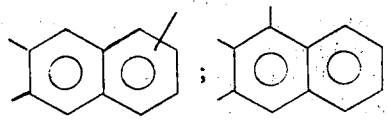

and

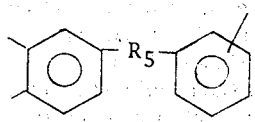

wherein $R_5$ represents $-CH_2-$, $-O-$, $-S-$, $-SO_2-$, $-CO-$, or

11. The imide-modified polyester resin as claimed in claim 11, wherein said tricarboxylic acid anhydride is trimellitic anhydride, hemimellitic anhydride, 3,4,3′ (or 3,4,4′)-biphenyltricarboxylic anhydride, 3,4,3′ (or 3,4,4′)-diphenylmethanetricarboxylic anhydride, 3,4,3′ (or 3,4,4′)-diphenylethertricarboxylic anhydride, 3,4,3′ (or 3,4,4′)-diphenylsulfidetricarboxylic anhydride, 3,4,3′ (or 3,4,4′)-diphenylsulfonetricarboxylic anhydride, 3,4,3′ (or 3,4,4′)-diphenylketonetricarboxylic anhydride, 3,4,3′ (or 3,4,4′)-diphenylpropanetricarboxylic anhydride, or 2,3,6 (or 2,3,5 or 1,2,4)-naphthalenetricarboxylic anhydride.

12. The imide-modified polyester resin as claimed in claim 1, wherein said imide-modified polyester resin comprises the reaction product of said imide ring containing dicarboxylic acid (I) esterified with at least one other polycarboxylic acid or the lower alkyl ester thereof selected from the group consisting of terephthalic acid, dimethyl terephthalate, diethylterephthalate, isophthalic acid, dimethyl isophthalate, diethyl isophthalate, 1,4-naphthalene dicarboxylic acid, 1,5-naphthalene dicarboxylic acid, 2,6-naphthalene dicarboxylic acid, or adipic acid.

13. The imide-modified polyester resin as claimed in claim 12, wherein said esterification reaction product is obtained at a temperature ranging from about 100° to 270°C.

14. The imide-modified polyester resin as claimed in claim 12, wherein said esterification reaction product is obtained in the absence of a solvent, in the presence of a solvent, or is carried out under reduced pressure.

15. The imide-modified polyester resin as claimed in claim 12, wherein the esterification reaction product is obtained in the presence of antimony trioxide, zinc acetate, lead acetate, cadmium acetate or manganese acetate as a catalyst and said polycarboxylic acid or the lower alkyl ester thereof is dimethyl terephthalate or dimethyl isophthalate.

16. The imide-modified polyester resin as claimed in claim 1, wherein said polyhydric alcohol is a dihydric alcohol, a trihydric alcohol or a tetrahydric alcohol.

17. The imide-modified polyester resin as claimed in claim 16, wherein said polyhydric alcohol is ethylene glycol, diethylene glycol, triethylene glycol, propylene glycol, dipropylene glycol, 1-methylpropylene glycol, neopentyl glycol, 1,6-hexanediol, glycerin, trimethylol propane, tris(2-hydroxyethyl)-isocyanurate or pentaerythritol.

18. A wire enamel containing the imide-modified polyester resin of claim 1 comprising the reaction product of (A) (1) a dicarboxylic acid of the formula (I)

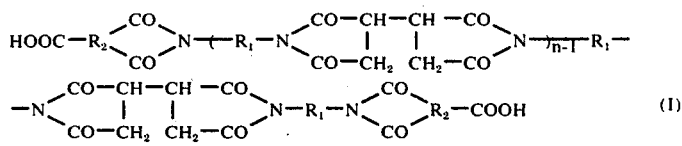

wherien $R_1$ represents a divalent organic group, $R_2$ represents a trivalent organic group, and $n \geq 1$, or (A) (2) a mixture of at least about 5% by weight of said dicarboxylic acid of the formula (I) with up to about 95% by weight of at least one other polycarboxylic acid or the lower alkyl ester thereof, with (B) a polyhydric alcohol; said dicarboxylic acid of the formula (I) comprising the reaction product of 1 mole of an imide compound having terminal amino groups of the formula (II)

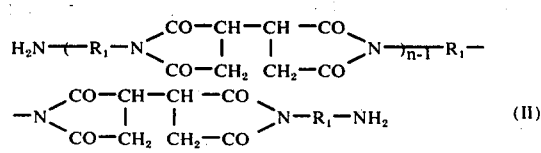

wherein $R_1$ has the same meaning as above, or of an imide precursor thereof, with 2 moles of tricarboxylic acid anhydride of the formula (III)

wherein $R_2$ has the same meaning as above, said imide compound of the formula (II) comprising the reaction product of $n$ moles of 1,2,3,4-butanetetracarboxylic acid with ($n+1$) moles of a diamine of the formula (IV)

wherein $R_1$ has the same meaning as above.

19. The wire enamel as claimed in claim 18, wherein said imide compound of the formula (II) comprises the reaction product of said 1,2,3,4-butanetetracarboxylic acid and said diamine in an aromatic solvent or in a nitrogen-containing solvent.

20. The wire enamel as claimed in claim 19, wherein said dicarboxylic acid of the formula (I) and said imide compound of the formula (II) both comprise the reaction product obtained at a temperature ranging from about 60° to 230°C.

21. The wire enamel as claimed in claim 18, wherein $n$ is 1 to 5.

22. The wire enamel as claimed in claim 18, wherein $R_1$ repprescnts a divalent aliphatic group, a divalent alicyclic group or a divalent aromatic group.

23. The wire enamel as claimed in claim 21, wherein $R_1$ is selected from the group consisting of

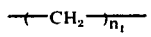

wherein $n_1$ is an integer of from 1 to 11;

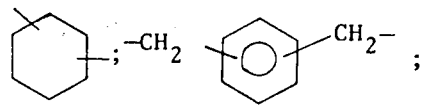

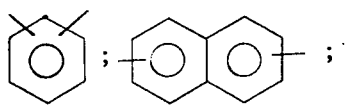

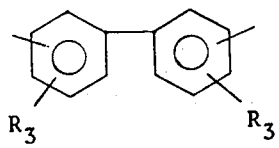

wherein $R_3$ is selected from the group consisting of —H, —Cl, —Br, —OCH$_3$, —CH$_3$ and —C$_2$H$_5$; and

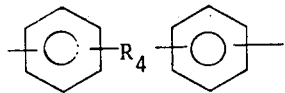

wherein $R_4$ is selected from the group consisting of —CH$_2$—, —O—, —S—, —SO$_2$—, —CO—,

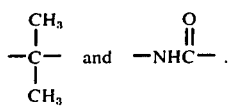

24. The wire enamel as claimed in claim 18, wherein said diamine is an aromatic diamine.

25. The wire enamel as claimed in claim 18, wherein said diamine is ethylenediamine, m-phenylenediamine, p-phenylenediamine, 4,4'-diaminodiphenylmethane, 4,4'-diaminodiphenylethane, 4,4'-diaminodiphenylpropane, 4,4'-diaminodiphenylether, 4,4'-diaminodiphenylsulfone, 3,3'-diaminodiphenylsulfone, 4,4'-diaminodiphenylsulfide, benzidine, 3,3'-dichlorobenzidine, 3,3'-dimethylbenzidine, p-bis(4-aminophenoxy)benzene, 1,5-diaminonaphthalene, 2,6-diaminonaphthalene, 3,3'-dimethyl-4,4'-diaminobiphenyl, 3,4'-diaminobcnzanilide, 3,3'-dimethoxybenzidine, 3,4'-diaminodiphenylether, m-xylylenediamine, p-xylylenediamine, di(p-aminocyclohexyl)methane, 4,4'-diaminophenylketone, hexamethylenediamine, heptamethylenediamine, octamethylenediamine, nonamethylenediamine, 4,4'-dimethylheptamethylenediamine, 3-methoxyheptamethylenediamine, 2,11-diaminododecane, 1,4-diaminocyclohexane, or 2,6-diaminopyridine.

26. The wire enamel as claimed in claim 17, wherein $R_2$ represents a trivalent aromatic group having 6 or more carbon atoms, with two bonds of the three bonds of $R_2$ being positioned adjacent each other.

27. The wire enamel as claimed in claim 26, wherein $R_2$ is selected from the group consisting of

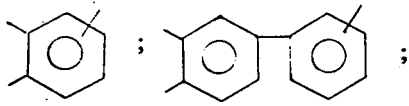

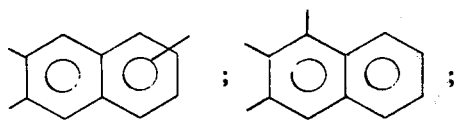

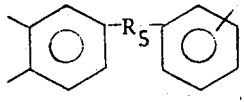

wherein $R_5$ represents —CH$_2$—, —O—, —S—, —SO$_2$—, —CO— or

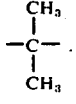

28. The wire enamel as claimed in claim 18, wherein said tricarboxylic acid anhydride is trimellitic anhydride, hemimellitic anhydride, 3,4,3' (or 3,4,4')-biphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, or 2,3,6 (or 2,3,5 or 1,2,4)-naphthalenetricarboxylic anhydride.

29. The wire enamel as claimed in claim 18, wherein said imide-modified polyester resin comprises the reaction product of said imide ring containing dicarboxylic acid (I) esterified with at least one other polycarboxylic acid or the lower alkyl ester thereof selected from the group consisting of terephthalic acid, dimethyl terephthalate, diethylterephthalate, isophthalic acid, dimethyl isophthalate, diethyl isophthalate, 1,4-naphthalene dicarboxylic acid, 1,5-naphthalene dicarboxylic acid, 2,6-naphthalene dicarboxylic acid, or adipic acid.

30. The wire enamel as claimed in claim 29, wherein said esterification reaction product is obtained at a temperature ranging from about 100° to 270°C.

31. The wire enamel as claimed in claim 29, wherein said esterification reaction product is obtained in the absence of a solvent, in the presence of a solvent, or is carried out under reduced pressure.

32. The wire enamel as claimed in claim 29, wherein the esterification reaction product is obtained in the presence of antimony trioxide, zinc acetate, lead acetate, cadmium acetate or manganese acetate as a catalyst and said polycarboxylic acid or the lower alkyl ester thereof is dimethyl terephthalate or dimethyl isophthalate.

33. The wire enamel as claimed in claim 18, including an organo-metal compound hardener.

34. The wire enamel as claimed in claim 33, including a metal octenoate or metal naphthenate as a hardening accelerator.

35. The wire enamel as claimed in claim 18, including at least one of a phenol resin, a melamine resin, an epoxy resin or a blocked polyisocyanate.

36. The wire enamel as claimed in claim 18, wherein said polyhydric alcohol is a dihydric alcohol, a trihydric alcohol or a tetrahydric alcohol.

37. The wire enamel as claimed in claim 36, wherein said polyhydric alcohol is ethylene glycol, diethylene glycol, triethylene glycol, propylene glycol, dipropylene glycol, 1-methylpropylene glycol, neopentyl glycol, 1,6-hexanediol, glycerin, trimethylol propane, tris(2-hydroxyethyl)isocyanurate or pentaerythritol.

* * * * *